United States Patent [19]

Nakamura et al.

[11] 3,969,001
[45] July 13, 1976

[54] CONTROL MECHANISM FOR AUTOMOTIVE VEHICLE HYDRAULIC BRAKING SYSTEM

[75] Inventors: Hiroyuki Nakamura, Toyota; Hiroshi Kawaguchi; Hideyuki Hayashi, both of Susono, all of Japan

[73] Assignee: Toyota Jidosha Kogyo Kabushiki Kaisha, Japan

[22] Filed: Aug. 29, 1974

[21] Appl. No.: 501,831

[30] Foreign Application Priority Data

Dec. 7, 1973  Japan............................. 48-136234

[52] U.S. Cl................................................. 303/21 F
[51] Int. Cl.²............................................ B60T 8/12
[58] Field of Search............... 303/6 C, 21 F, 21 FS, 303/21 FM, 21 RM; 188/181 A

[56] References Cited
UNITED STATES PATENTS

| | | | |
|---|---|---|---|
| 3,617,098 | 11/1971 | Leiber............................ | 303/21 FS |
| 3,729,233 | 4/1973 | Mangold......................... | 303/21 FS |
| 3,823,987 | 7/1974 | Kurichh...................... | 303/21 FRM |
| 3,836,207 | 9/1974 | Belart............................ | 303/21 FM |

Primary Examiner—Duane A. Reger
Attorney, Agent, or Firm—Toren, McGeady and Stanger

[57] ABSTRACT

A hydraulic braking system for a vehicle is provided wherein a hydraulic brake pressure control device which includes a solenoid valve and a switching valve is arranged in a rear brake hydraulic circuit of the system. The solenoid valve applies braking fluid pressure on the wheel cylinder side of the braking system to an accumulator when wheel lock occurs and thereby lowers the wheel cylinder fluid pressure by increasing the volume within the circuit on the wheel cylinder side. The switching valve cuts off the rear brake hydralic circuit by means of an interlocking operation with a piston of the accumulator. Thus, the wheel lock is released and a relief valve or a pressure regulator is provided in parallel with the hydraulic brake pressure control device so that after release of the wheel lock the wheel cylinder fluid pressure is raised in correspondence with the relationship of allotted braking forces between the front and rear wheels.

4 Claims, 6 Drawing Figures

CONTROL MECHANISM FOR AUTOMOTIVE VEHICLE HYDRAULIC BRAKING SYSTEM

BACKGROUND OF THE INVENTION

The present invention relates to automotive vehicle hydraulic braking systems and more particularly to a mechanism for controlling the application of hydraulic fluid pressure thereby preventing wheel lock at braking.

Means for preventing wheel lock in automotive vehicles and for securing vehicle stability at braking have included anti-skid devices hitherto proposed which employ atmospheric pressure and a negative pressure in order to effect operation of a valve and to electrically control wheel cylinder hydraulic pressure upon the occurrence of wheel lock. In such devices, the decrease of pressure upon the vehicle brake pedal and the shortening of the braking distance can be effected with high precision by utilizing the coefficient of friction which occurs between the vehicle tires and the road surface. However, the controls involved are rather complicated and the number of components which must be utilized is large. It is thus found that prior art devices can be disadvantageous due to the fact that they are expensive and are prone to malfunction.

In order to eliminate such disadvantages, the present invention proposes that in combination with a hydraulic brake circuit there be provided a hydraulic brake pressure control device which holds the wheel cylinder hydraulic pressure at a certain value during wheel lock with a relief valve or pressure regulator being also provided to control the wheel cylinder hydraulic pressure after wheel lock has been released.

SUMMARY OF THE INVENTION

Briefly, the present invention may be described as a control mechanism applied in a hydraulic braking system for a vehicle having front and rear wheels wherein said system includes front and rear master cylinder means, front and rear wheel cylinder means, hydraulic braking fluid pressure means and a hydraulic brake fluid circuit means for distributing hydraulic fluid pressure in the system, said circuit means including a rear brake hydraulic circuit means extending between the rear master cylinder means and the rear wheel cylinder means. More particularly, the present invention comprises a mechanism for said braking system comprising, in combination, means for sensing locking of the vehicle wheels, a hydraulic brake pressure control device operative to lower wheel cylinder fluid pressure and hold said pressure at a specific value upon the occurrence of wheel lock, and pressure regulating means operative to raise wheel cylinder fluid pressure in correspondence with the relationship between braking forces applied to the front and rear wheels of the vehicle after wheel lock has been released, the hydraulic brake pressure control device and said pressure regulating means being incorporated in parallel with each other within said rear brake hydraulic means extending between said rear master cylinder means and said rear wheel cylinder means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
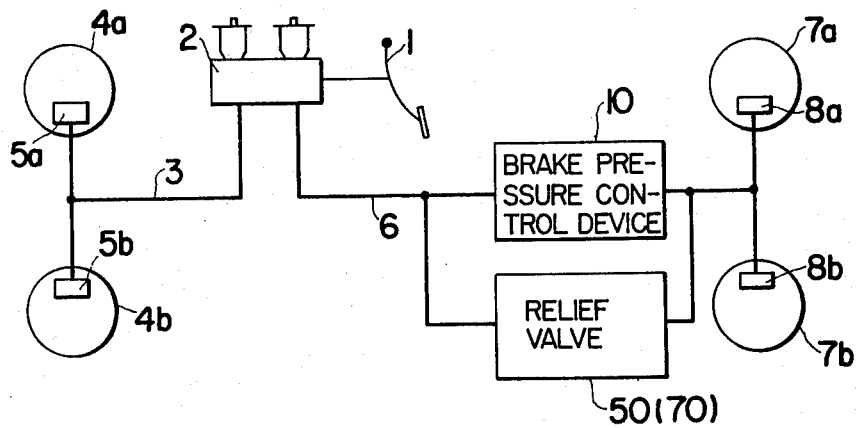
FIG. 1 is a schematic diagram depicting a hydraulic braking system comprising the present invention.

Referring to FIG. 1, there is shown a master cylinder 2 which is operative to generate hydraulic brake pressure corresponding to the level to which a brake pedal 1 of a vehicle is depressed. The master cylinder 2 is connected to front wheel cylinders 5a, 5b of front wheels 4a, 4b through a front brake hydraulic circuit 3. A rear brake hydraulic circuit 6 extending to rear wheel cylinders 8a, 8b for rear wheels 7a, 7b of the vehicle has connected therein a hydraulic brake pressure control device 10 and a relief valve 50. Alternatively, in place of the relief valve 50, a pressure regulator 70 may be provided. It will be noted that the hydraulic brake pressure control device 10 and the relief valve 50 or the pressure regulator 70 are connected in parallel within the rear brake hydralic circuit 6.

Figure 2:
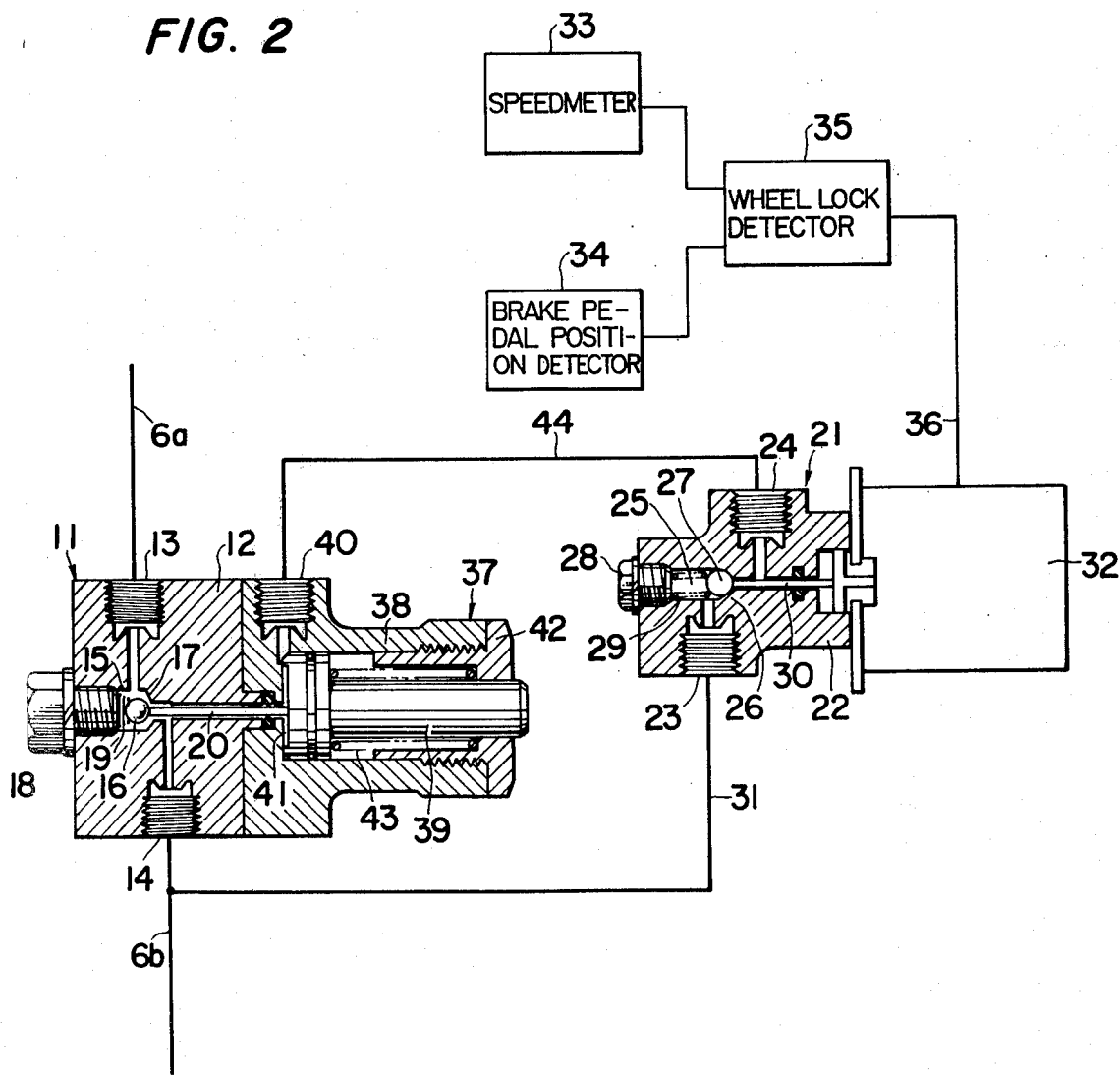
FIG. 2 is a system circuit diagram showing parts in section, depicting a hydraulic brake pressure control device in accordance with the present invention.

Referring now to FIG. 2, the hydraulic brake pressure control device 10 is depicted as including a switching valve 11, a solenoid valve 21 and an accumulator 37. The switching valve 11 includes ports 13 and 14 located on a valve body 12, with the port 13 being connected to a circuit element 6a extending on the master cylinder side of the valve and a circuit element 6b extending on the wheel cylinder side.

An oil chamber 15 located between the ports 13 and 14 includes therein a ball 16 which is arranged in such a manner that it is able to be brought into contact with a valve seat 17. A spring 19 is provided between the ball 16 and a bolt 18 which is threadedly engaged within the body 12 closing off the oil chamber 15. On the side of the ball 16 remote from the spring 19 there is provided a push rod 20 which is held in contact with the ball 16 and which may be operated to displace the ball 16.

The solenoid valve 21 is provided with a valve body 22 including ports 23 and 24, with an oil chamber 25 being provided within the valve 21. A ball 27 located within the oil chamber 25 is adapted to engage a valve seat 26 under the action of a spring 29 with a push rod 30 being arranged to actuate the ball 27 out of engagement with the seat 26.

The port 23 is connected within an auxiliary hydraulic branch circuit which includes circuit element 31 branched from the circuit element 6b. The push rod 30 is arranged to be actuated by operation of a solenoid 32. The solenoid 32 is connected by means of an electrical circuit 36 to a wheel lock detector 35 which, upon the occurrence of a wheel lock, will emit a signal to the solenoid 32. The wheel lock detector 35 receives as an input thereto a rear wheel rotational speed signal from a speedometer 33 and a brake pedal actuating signal from a brake pedal position detector 34. The signals thus received enable the detector 35 to discriminate between the presence and the absence of a wheel lock condition.

At wheel lock, a signal emitted from the detector 35 is received as an input to the solenoid 32 in order to actuate the push rod 30. As a result, the ports 23 and 24 will be brought into flow communication. The accumulator 37 includes a piston 39 movably inserted into a cylinder 38 which is arranged on the extension of the push rod 20 of the switching valve 11. At one end of a larger diameter portion of the piston 39, an oil chamber 41 communicating with a port 40 is formed, with the push rod 20 of the switching valve 11 being there brought into contact with the piston 39. A return spring 43 is disposed between the other end of the larger diameter portion of the piston 39 and a plug 42 threadedly engaged within the cylinder 38. The port 40 is connected within the branched hydraulic circuit by a circuit element 44 with the port 24 of the solenoid valve 21. Switching of the valve 11 is controlled according to the volumetric change of the oil chamber 41 as will arise from the movement of the piston 39.

With the foregoing structural arrangement, in a situation where the master cylinder hydraulic pressure is low, no signal will be generated from the wheel lock detector 35. The solenoid valve will, accordingly, be closed to cut off the circuit elements 31 and 44. Consequently, the piston 39 of the accumulator 37 will be located toward the left side thereof, as viewed in FIG. 2, by operation of the spring 43. Thus, the volume of the oil chamber 41 will be maintained at its smallest level.

The push rod 20 is moved leftwardly along with the piston 39. Thus, the switching valve 11 will be opened to raise the wheel cylinder hydraulic pressure in proportion to the master cylinder hydraulic pressure. Subsequently, when a signal is generated from the wheel lock detector 35 upon the occurrence of wheel lock, the solenoid valve 21 will be opened so that the wheel cylinder hydraulic pressure will be supplied through the circuits 31 and 44 to the oil chamber 41 of the accumulator 37. As a result, the piston 39 will be moved rightwardly through a particular stroke which is determined by the spring force of the spring 43 and the effective area of the oil chamber 41. Accordingly, the volume of the oil chamber 41 will be increased.

Additionally, pressure upon the ball 16 from the push rod 20 will be released to close the switching valve 11. The circuit element 6a on the master cylinder side and the circuit element 6b on the wheel cylinder side are, therefore, cut off with the result that the hydraulic pressure is no longer supplied. Furthermore, due to a volume increase on the wheel cylinder side, the wheel cylinder hydraulic pressure decreases to some extent from a high value. When wheel lock is released in this condition, the signal from the wheel lock detector 35 disappears and as a result the solenoid valve 21 is again closed. Since the piston 39 of the accumulator 37 is held in a state to which it is moved on the right side, the switching valve 11 maintains its closed state. At this time, the wheel cylinder oil pressure maintains a somewhat reduced valve referred to above. As a result, wheel cylinder oil pressure assumes a value depicted by a full line $a$ shown in FIG. 4 relative to the master cylinder oil pressure.

Figure 3:
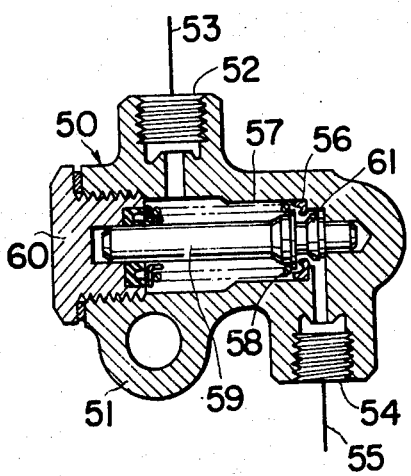
FIG. 3 is a sectional view showing a relief valve according to the present invention.

As illustrated in FIG. 3, the relief valve 50 comprises a port 52 located within a valve body 51 and connected by a hydraulic circuit element 53 with the circuit 6a on the master cylinder side. A port 54 is connected by a hydraulic circuit element 55 with the circuit 6b on the wheel cylinder side. Between the ports 52 and 54, there is provided an oil chamber 57 having a valve seat 56. Within the oil chamber 57, a piston 59 is supported by a spring 58 with the piston 59 being inserted in a manner to be movable in association with a plug 60 and the body 51 within which the piston is fitted. The piston 59 is provided with a valve member 61 which is adapted to come into contact with the valve seat 56. Where the master cylinder hydraulic pressure is low, the oil pressure is supplied to the wheel cylinders 8a and 8b without change. When master cylinder hydraulic pressure reaches a certain specified value, however, the valve member 61 as well as the spring 58 will be moved leftwardly by an oil pressure acting upon the piston 59. In response to the relationship of the balance which in this case exists between the oil pressure on the piston 59 and spring force of the spring 58, the wheel cylinder oil pressure will be reduced at a particular rate. The wheel cylinder oil pressure is thus controlled by the relief valve 50 and assumes characteristics depicted by the broken line $b$ shown in FIG. 4. It will comprise a pressure reduction characteristic extending along a curve $d$ of the dotted line which ideally sets the distribution of braking forces on the front and rear wheel sides.

Figure 4:
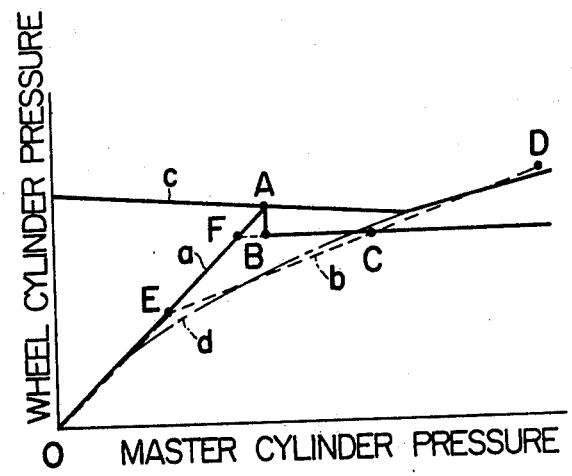
FIG. 4 is a graphical illustration showing hydraulic brake pressure characteristics according to the present invention.

Referring now to FIG. 4, there will be described the braking operation on the side of the rear wheels 7a and 7b which is effected by the hydraulic brake pressure control device 10 and the relief valve 50 constructed and arranged as hereinbefore described. During the interval from the initiation of braking force until the occurrence of wheel lock during which master cylinder oil pressure is comparatively low, pressure reducing action initiated by the relief valve 50 will be at a point E along the curve depicted in FIG. 4. Due to the full opening of the switching valve 11, wheel cylinder oil pressure will rise along the solid line $a$ in a proportional relationship to the master cylinder oil pressure. Subsequently, wheel cylinder oil pressure will abruptly rise until it reaches a straight line $c$ at a point A, the line $c$ indicating a situation where the rear wheels 7a and 7b are locked in dependence upon the relationship between braking force and the coefficient of friction between the wheel tires and the road surface. Wheel cylinder oil pressure is held at a value indicated by point B which is somewhat lower than point A, by a signal from the wheel lock detector 35 and the operation of the accumulator 37 and the switching valve 11. Thus, wheel lock is released.

When the wheel cylinder oil pressures, through operation of the brake pressure control device 10 and the relief valve 50, become coincident at a point C, the wheel cylinder oil pressure subsequent to that time will rise along a dotted line $b$ by operation of the relief valve 50 until it reaches a point D. When braking action is released to lower the master cylinder oil pressure, the wheel cylinder oil pressure is lowered from the point D by way of point C, point B and a point F by operation of the relief valve 50. The wheel cylinder oil pressure is higher than the master cylinder oil pressure after point F has been reached, and the set spring load of the spring 19 of the switching valve 11 will be very small. The ball 16 is therefore caused to move away from the valve seat 17 by the wheel cylinder oil pressure on the piston 39 of the accumulator 37 and returns to its original position so that wheel cylinder oil pressure is further lowered until it becomes zero. At this point, since the set spring load of the spring 29 of the solenoid valve 21 is very small, the oil pressure confined within the hydraulic circuit 44 and the oil chamber 41 of the accumulator 37 is also lowered with retreat of the ball 27 and becomes zero.

Figure 5:
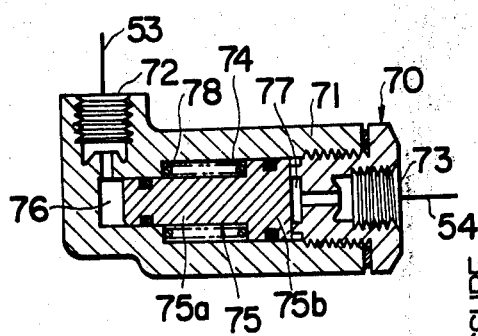
FIG. 5 is a sectional view of a pressure regulator according to the present invention.

FIG. 5 depicts the pressure regulator 70 which is another example of the pressure regulating means adapted to operate in the present invention to perform functions similar to those of the relief valve 50. A port 72 in a body 71 is connected to a hydraulic circuit element 53 on the master cylinder side, while a port 73 is connected to a hydraulic circuit element 54 on the wheel cylinder side. In the interior of a cylinder 74 located between the ports 72 and 73, there is provided a stepped piston 75 having a smaller diameter land 75a and a larger diameter land 75b with the piston 75 being movably inserted within the cylinder 74. Oil chambers 76 and 77 are formed, respectively, between the port 72 and the smaller diameter land 75a and between the port 73 and the larger diameter land 75b. Furthermore, spring 78 is disposed on the larger diameter land 75b of the piston 75 in order to diminish the volume of the oil chamber 77. Thus, the piston 75 moves rightwardly or leftwardly in accordance with the effective areas of the lands 75a and 75b, the set spring load of the spring 78, and the relationship between master cylinder hydraulic pressure and wheel cylinder hydraulic pressure which vary sequentially, for example, in direct proportion to each other. Under conditions wherein forces acting on the right and left sides of the piston 75 are balanced, the piston is moved by the master cylinder oil pressure and raises or lowers the wheel cylinder oil pressure.

Figure 6:
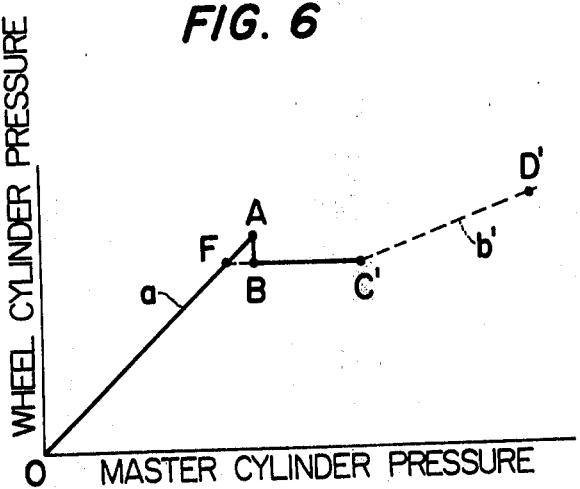
FIG. 6 is a graphical representation illustrating different hydraulic brake pressure characteristics in accordance with the present invention.

Braking operation based upon the hydraulic brake pressure control device 10 and the pressure regulator 70 may be explained by reference to FIG. 6. Until wheel lock occurs after the initiation of braking, the wheel cylinder oil pressure rises in a proportional relationship in accordance with a solid line *a* in FIG. 6 relative to master cylinder oil pressure owing to the full opening of the switching valve 11, and both these oil pressures will be equal. Therefore, where their values are small during this process, the piston 75 of the pressure regulator 70 is held in this position to the right side as seen in FIG. 5 by an oil pressure acting on the smaller diameter land 75a and the set spring load of the spring 78. When the wheel cylinder oil pressure becomes somewhat higher, the piston 75 will be, conversely, moved toward the left side by oil pressure acting upon the larger diameter land 75b. At the occurrence of wheel lock depicted at point A, the wheel cylinder oil pressure will be held at a somewhat reduced value indicated by a point B by means of the hydraulic brake pressure control device 10. At this time, the piston 75 of the pressure regulator 70 will still be located at the left side thereof. After the release of wheel lock, the master cylinder oil pressure will increase and the forces acting on the right and left sides of the piston 75 will balance at a point C'. Then, the piston 75 will be moved rightwardly according to the rise in master cylinder oil pressure. The wheel cylinder oil pressure will also rise along a dotted straight line *b'* determined by the balanced relationship and it will reach a point D'. Also, in this case, when the braking action is released, the piston 75 of the pressure regulator 70 is again moved leftwardly in accordance with the fall of master cylinder oil pressure and thus wheel cylinder oil pressure will be lowered and returned to the point C'. At this point C', however, the master cylinder oil pressure is still higher and the switching valve 11 cannot be opened. Therefore, the wheel cylinder oil pressure maintains its value at this time. When master cylinder oil pressure is lowered from the point C' by way of the point B to a point F, the switching valve 11 and subsequently the solenoid valve 21 are opened. After point F is reached, the wheel cylinder oil pressure and the oil pressure of the hydraulic circuit 44, as well as that of the oil chamber 41 of the accumulator 37, become lower according to the fall of the master cylinder oil pressure and they become zero. In this case, by selecting various constants of the pressure regulator 70, the braking forces on the front and rear wheels can be ideally distributed as indicated by the dotted line *b'* as in the case where the relief valve 50 is utilized.

As described above, in accordance with the present invention, locking of the rear wheels 7a and 7b can be prevented by combining the hydraulic brake pressure control device and the relief valve 50 or the pressure regulator 70 so that the braking system will be simple in construction, less troublesome and will exhibit advantageous features with regard to its cost. At braking, the buildup of the wheel cylinder oil pressure of the rear wheels 7a and 7b will be large and the braking force will be effectively applied as in the case of prior art anti-skid devices so that easing of the force upon the vehicle brake pedal and shortening of the braking distance will be possible. It will also be possible to increase the allotment of the braking force onto the rear wheel side, so that a design in which the front and rear wheel sides are balanced with respect to the abrasion characteristics and temperature characteristics of the lining of the brake drum and the pad of a disc brake are possible. This in turn enables stabilization of the front and rear wheel sides at braking and reduction of the difference between the braking torques of the right and left wheels becomes possible.

While specific embodiments of the invention have been shown and described in detail to illustrate the application of the inventive principles, it will be understood that the invention may be embodied otherwise without departing from such principles.

What is claimed is:

1. In a hydraulic braking system for a vehicle having front and rear wheels, said system including front and rear master cylinder means, front and rear wheel cylinder means, hydraulic braking fluid pressure means and hydraulic brake fluid circuit means for distributing hydraulic fluid pressure in said system, said circuit means including rear brake cylinder circuit means extending between said rear master cylinder means and said rear wheel cylinder means, the combination comprising means for sensing locking of said wheels and for generating a signal indicating the occurrence of wheel lock, a hydraulic brake pressure control device responsive to said wheel lock sensing means adapted to be actuated to a first and a second operative condition, said control device being actuated to said first operative condition to lower wheel cylinder fluid pressure upon receipt from said wheel lock sensing means of the first signal indicating wheel lock occurring while said control device is in said second operative condition, said control device while in said first operative condition being nonresponsive to subsequent wheel lock signals received from said wheel lock sensing means until said control device is subsequently actuated back to said second operative condition, and pressure regulating means connected in parallel with said hydraulic brake pressure control device within said rear brake hydraulic circuit means extending between said master cylinder means and said rear wheel cylinder means, said pressure regulating means being operative while said control device is in said first operative condition to control wheel cylinder fluid pressure in accordance with a predetermined relationship in correspondence with the relationship between braking forces applied to said front and rear wheels after wheel lock has been released.

2. A system according to claim 1 wherein said hydraulic brake pressure control device comprises a switching valve operative to open and close flow within said rear brake hydraulic circuit, and an auxiliary fluid pressure circuit formed as a branch of said rear brake hydraulic circuit, valve means operative to open at the occurrence of wheel lock said auxiliary branched circuit, and an accumulator which increases the volume within said hydraulic circuit means on the rear wheel cylinder side and which closes said switching valve by fluid pressure applied from said valve means at wheel lock.

3. A system according to claim 1 wherein said pressure regulating means comprises means defining a cylinder, a piston movably mounted within said cylinder, a valve seat defined at one end of said cylinder, valve means on said piston adapted to engage said valve seat, means communicating the interior of said cylinder with said master cylinder means on one side of said valve seat and means communicating said cylinder with said wheel cylinder means on the opposite side of said valve seat, spring means urging said piston to move in a direction causing said valve means to be moved to open said valve seat, said piston being movable to close said valve seat under the action of pressure from said master cylinder means.

4. A system according to claim 1 wherein said pressure regulating means comprises a piston having a smaller diameter land and a larger diameter land, a cylinder having said piston movably inserted therein, a first fluid pressure chamber operative to cause fluid pressure from said master cylinder means to act upon said smaller diameter land of said piston, a second fluid chamber operative to cause fluid pressure from said wheel cylinder means to act upon said larger diameter land of said piston, and spring means urging said piston to move toward said second fluid chamber whereby forces acting on both sides of said piston are balanced by fluid pressure from said master cylinder means after wheel lock has been released and by fluid pressure from said wheel cylinder means maintained by said hydraulic brake pressure control device.

* * * * *